(12) United States Patent
Edwards et al.

(10) Patent No.: US 12,327,374 B2
(45) Date of Patent: Jun. 10, 2025

(54) SYSTEMS AND METHODS FOR USING LOCATION-RELATED DATA TO GENERATE VIRTUAL CERTIFICATION NUMBER DATA FOR AN INTERACTION

(71) Applicant: Capital One Services, LLC, McLean, VA (US)

(72) Inventors: Joshua Edwards, Carrollton, TX (US); Michael Mossoba, Great Falls, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 394 days.

(21) Appl. No.: 18/058,448

(22) Filed: Nov. 23, 2022

(65) Prior Publication Data

US 2024/0169581 A1     May 23, 2024

(51) Int. Cl.
    *G06T 7/73*     (2017.01)
    *G06Q 20/38*     (2012.01)
    *G06T 11/00*     (2006.01)

(52) U.S. Cl.
    CPC ............ *G06T 7/73* (2017.01); *G06Q 20/389* (2013.01); *G06T 11/00* (2013.01); *G06T 2207/20081* (2013.01)

(58) Field of Classification Search
    CPC . G06T 7/73; G06T 11/00; G06T 2207/20081; G06Q 20/389; G06Q 20/321; G06Q 20/4015
    USPC ........................................ 382/103
    See application file for complete search history.

(56) References Cited

U.S. PATENT DOCUMENTS

| | | | |
|---|---|---|---|
| 10,521,776 B2 | 12/2019 | Zhou et al. | |
| 10,825,302 B2 | 11/2020 | Baerlocher et al. | |
| 11,068,968 B2 | 7/2021 | Kuoh et al. | |
| 11,195,334 B2 | 12/2021 | Nelson et al. | |
| 2020/0234303 A1* | 7/2020 | Arumugam | G06Q 20/385 |
| 2021/0357018 A1 | 11/2021 | Gabriele et al. | |

OTHER PUBLICATIONS

CNBC, Google Maps has a wild new feature that will guide you through indoor spaces like airports, 5 pages, Mar. 30, 2021, https://www.cnbc.com/2021/03/30/google-maps-launches-augmented reality-directions-for-indoor-spaces.html.
(Continued)

*Primary Examiner* — Stephen P Coleman
(74) *Attorney, Agent, or Firm* — Bookoff McAndrews, PLLC

(57) ABSTRACT

A method for generating virtual certification number data may comprise: receiving real-time image data from a camera of a user device; parsing location features data from the real-time image data; determining, based on the location features data, a location of the user device; upon determining the location of the user device, detecting, based on the real-time image data, a terminal at the location; upon detecting the terminal at the location, generating virtual certification number data for the user specific to the location; causing the user device to store the virtual certification number data for the user on a memory device associated with the user device; and transmitting the virtual certification number data to the terminal at the location.

20 Claims, 9 Drawing Sheets

(56) References Cited

OTHER PUBLICATIONS

CNBC, Mastercard launches augmented reality app that brings card benefits to life, 7 pages, Oct. 6, 2020, https://www.cnbc.com/select/mastercard-launches-augmented reality-app/.

Thinkml, Augmented Reality is Revolutionizing Fintech and Payments Industry, 16 pages, Oct. 25, 2020, https://thinkml.ai/augmented reality-is-revolutionizing-fintech-payment-industry/.

True Merchant, The Brand New Mastercard Augmented Reality App, 7 pages, 2021, https://truemerchant.com/the-brand-new-mastercard-augmented-reality-app/.

Youtube, Augmented Reality Payment with Visa, 3 pages, Mar. 15, 2017, https://www.youtube.com/watch?app=desktop&v=19jH--vdA5g.

* cited by examiner

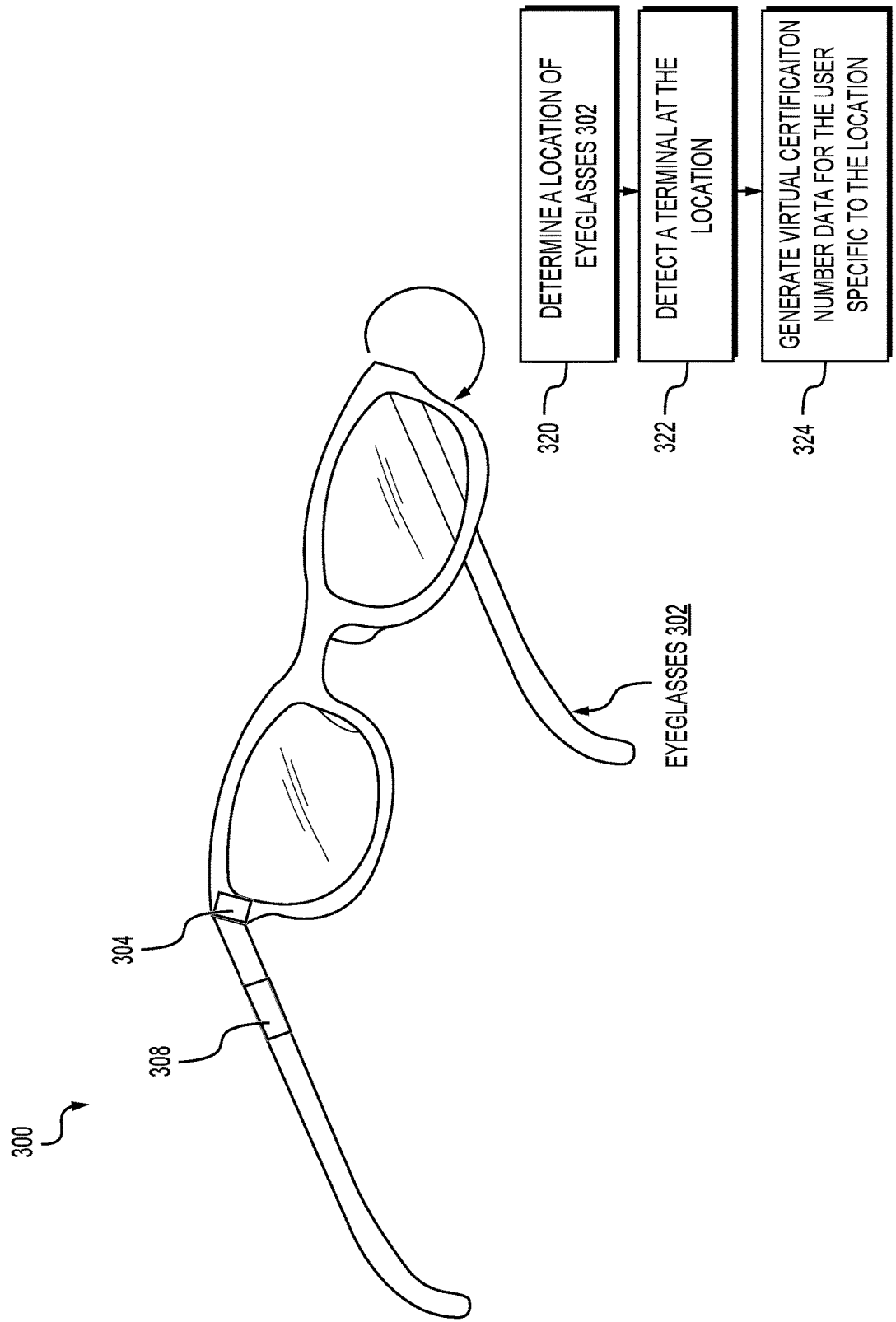

SYSTEMS AND METHODS FOR USING LOCATION-RELATED DATA TO GENERATE VIRTUAL CERTIFICATION NUMBER DATA FOR AN INTERACTION

TECHNICAL FIELD

Various embodiments of this disclosure relate generally to using location-related data, and, more particularly, to systems and methods for using location-related data to generate virtual certification number data for an interaction.

BACKGROUND

Virtual certification numbers may be used to increase interaction (e.g., transaction) security when they can be associated with a merchant. For example, a virtual certification number may be associated with a merchant when a customer is using a browser extension, and the extension can recognize the merchant associated with the website for which the customer generated the virtual certification number. However, conventional techniques for generating virtual certification numbers for in-person shopping is more difficult, if not impossible. As a result, generated virtual certification numbers may not be bound to specific merchants, which may leave virtual certification numbers susceptible to fraud.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for using location-related data to generate virtual certification number-related data for an interaction.

In one aspect, a computer-implemented method for generating virtual certification number data may include: receiving real-time image data from a camera of a user device; parsing location features data from the real-time image data; determining, based on the location features data, a location of the user device; upon determining the location of the user device, detecting, based on the real-time image data, a terminal at the location; upon detecting the terminal at the location, generating virtual certification number data for the user specific to the location; causing the user device to store the virtual certification number data for the user on a memory device associated with the user device; and transmitting the virtual certification number data to the terminal at the location.

In another aspect, a computer-implemented method for generating virtual certification number data may include: receiving real-time image data from one or more cameras of a wearable user device, wherein the real-time image data includes picture or video images of an environment surrounding the wearable user device; parsing location features data from the real-time image data; determining, based on the location features data, a location of the wearable user device; upon determining the location of the wearable user device, detecting, based on the real-time image data, a terminal at the location; upon detecting the terminal at the location, generating virtual certification number data for the user specific to the location; causing the user device to store the virtual certification number data for the user on a memory device associated with the wearable user device; transmitting the virtual certification number data to the terminal at the location; after transmitting the virtual certification number data to the terminal at the location, receiving an approval indication associated with the virtual certification number data; and causing the user device to present, via a display of the wearable user device, a graphical representation of the approval indication.

In another aspect, computer-implemented system for generating virtual certification number data, the system may include: a memory having processor-readable instructions therein; and at least one processor configured to access the memory and execute the processor-readable instructions, which when executed by the processor configures the processor to perform a plurality of functions, including functions for: receiving real-time image data from a camera of a user device; parsing location features data from the real-time image data; determining, based on the location features data, a location of the user device; upon determining the location of the user device, detecting, based on the real-time image data, a terminal at the location; upon detecting the terminal at the location, generating virtual certification number data for the user specific to the location; causing the user device to store the virtual certification number data for the user on a memory device associated with the user device; and transmitting the virtual certification number data to the terminal at the location.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3F depict an example of using location-related data for generating virtual certification number data for an interaction, according to one or more embodiments.

DETAILED DESCRIPTION OF EMBODIMENTS

Figure 1:
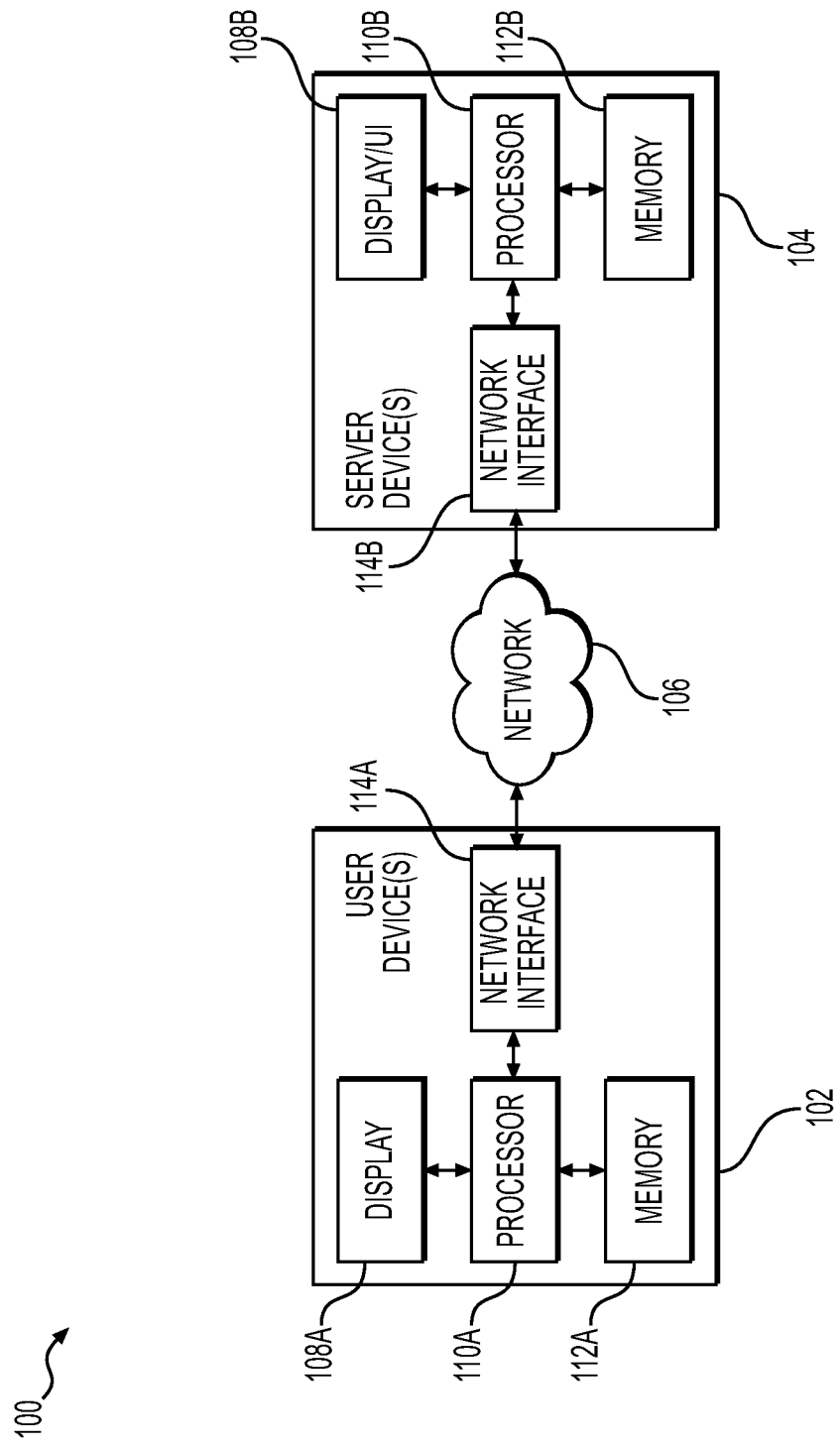
FIG. 1 depicts an exemplary environment 100 for using location-related data for generating virtual certification number data for an interaction, according to one or more embodiments.

According to certain aspects of the disclosure, methods and systems are disclosed for using location-related data for generating virtual certification number data, e.g., for use in an interaction at a location. However, conventional techniques may not be suitable. For example, conventional techniques may not facilitate use of merchant-specific virtual certification numbers for in-person interactions. Accordingly, improvements in technology relating to generating virtual certification numbers are needed.

As will be discussed in more detail below, in various embodiments, systems and methods are described for using location-related data to generate virtual certification number data for an interaction, e.g., for an in-person interaction (e.g., transaction). By training a machine learning model, e.g., via supervised or semi-supervised learning, to learn associations between image data and merchant location data, the trained machine learning model may be usable to use location-related data to generate virtual certification number data.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining or "in response to detecting," depending on the context. Similarly, the phrase "if it is determined" or f [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, certain embodiments may use a machine learning model to process image data gathered from a user device to identify a location of a user. Certain embodiments may then detect that the user is at a merchant, such as at an interaction terminal of the merchant (terminal). Based on this, certain embodiments may generate merchant-specific virtual certification number data for use during an interaction at the merchant.

While several of the examples herein involve image data, it should be understood that techniques according to this disclosure may be adapted to any suitable type of location-related data, such as global positioning system (GPS) data, and combinations of image data and GPS data. It should also be understood that the examples herein are illustrative only. The techniques and technologies of this disclosure may be adapted to any suitable activity.

Presented below are various aspects of machine learning techniques that may be adapted to use location-related data for generating virtual certification number data. As will be discussed in more detail below, machine learning techniques adapted to generate virtual certification number data may include one or more aspects according to this disclosure, e.g., a particular selection of training data, a particular training process for the machine learning model, operation of a particular device suitable for use with the trained machine learning model, operation of the machine learning model in conjunction with particular data, modification of such particular data by the machine learning model, etc., and/or other aspects that may be apparent to one of ordinary skill in the art based on this disclosure.

FIG. 1 depicts an exemplary environment 100 for using location-related data for generating virtual certification number data for an interaction, according to one or more embodiments. The environment 100 may include one or more user devices 102, one or more server devices 104, and a network 106. Although FIG. 1 depicts a single user device 102, server device 104, and network 106, the embodiments described herein are applicable to environments 100 that include two or more user devices 102, server devices 104, and/or networks 106 in any suitable arrangement. For example, in some arrangements, environment 100 may include two user devices 102 (e.g., a smartphone and a smart wearable such as smart eyeglasses), each associated with a same user. Furthermore, environment 100 may include one or more user devices 102 for each of a plurality of associated users.

The user device 102 may include a display 108A, a processor 110A, a memory 112A, and/or a network interface 114A. The user device 102 may be a mobile device, such as a smartphone, a cell phone, a tablet, a laptop computer, etc., a desktop computer, and/or the like. The user device 102 may be wearable, e.g., a smart wearable such as smart eyeglasses, as discussed in more detail below. The user device 102 may execute, by the processor 110A, one or more instructions stored in the memory 112A to, e.g., generate virtual certification number data, or train and/or use one or more machine learning models to generate virtual certification number data, as described elsewhere herein. One or more components of the user device 102 may generate, or may cause to be generated, one or more graphic user interfaces (GUIs) based on instructions/information stored in the memory 112A, instructions/information received from the server device 104, and/or the like, and may cause the GUIs to be displayed via the display 108A. The GUIs may be, e.g., mobile application interfaces, virtual/augmented reality interfaces, or browser user interfaces and may include text, input text boxes, selection controls, and/or the like. The display 108A may include a touch screen or a display with other input systems (e.g., a mouse, keyboard, etc.) for an operator of the user device 102 to control the functions of the user device 102. The network interface 114A may be a transmission control protocol/Internet protocol (TCP/IP) network interface, or another type of wired or wireless communication interface, for Ethernet or wireless communications with the server device 104 via the network 106.

The server device 104 may include a display/user interface (UI) 108B, a processor 110B, a memory 112B, and/or a network interface 114B. The server device(s) 104 may be a computer, system of computers (e.g., rack server(s)), or a cloud service computer system (e.g., in a data center). The server device 104 may execute, by the processor 110B, one or more instructions stored in the memory 112B to, e.g., generate virtual certification number data, or train and/or use one or more machine learning models to generate the virtual certification number data, as described elsewhere herein. One or more components of the server device 104 may generate, or may cause to be generated, one or more GUIs based on instructions/information stored in the memory 112B, instructions/information received from the user device 102, and/or the like and may cause the GUIs to be displayed via the display 108B.

The network 106 may include one or more wired and/or wireless networks, such as the Internet, an intranet, a wide area network (WAN), a local area network (LAN), a personal area network (PAN), a cellular network (e.g., a 3G network, a 4G network, a 5G network, etc.) or the like. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "webpage" generally encompasses a location, data store, or the like that is, e.g., hosted and/or operated by a computer system so as to be accessible online, and that may include data configured to cause a program such as a web browser to perform operations such as send, receive, or process data, generate a visual display and/or an interactive interface, or the like. The user device 102 and the server device 104 may be connected via the network 106, using one or more standard communication protocols. The user device 102 and the server device 104 may transmit and receive messages from each other across the network 106, as discussed in more detail below.

As discussed in further detail below, the one or more components of exemplary environment 100 may process data from one or more user devices 102 and/or one or more server devices 104. Additionally, or alternatively, and as discussed in further detail below, the one or more components of exemplary environment 100 may generate, store, train and/or use a machine learning model for generating virtual certification number data. The exemplary environment 100 or one of its components may include or be in operable communication with a machine learning model and/or instructions associated with the machine learning model, e.g., instructions for generating a machine learning model, training the machine learning model, using the machine learning model, etc. The exemplary environment 100 or one of its components may include instructions for retrieving data, adjusting data, e.g., based on the output of the machine learning model, and/or operating a display to output data, e.g., as adjusted based on the machine learning model. The exemplary environment 100 or one of its components may include, provide, obtain, and/or generate training data.

In some embodiments, a system or device other than the components shown in the exemplary environment 100 may be used to generate and/or train the machine learning model. For example, such a system may include instructions for generating and/or obtaining the machine learning model, the training data and ground truth, and/or instructions for training the machine learning model. A resulting trained machine learning model may then be provided to the exemplary environment 100 or one of its components and, for example, stored in the memory 112A and/or 112B.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Certain embodiments may utilize, for training a machine learning model, unsupervised learning where, e.g., the sample of training data may not include pre-assigned labels or scores to aid the learning process, or may utilize semi-supervised learning, where a combination of training data with pre-assigned labels or scores and training data without pre-assigned labels or scores is used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., may be used to compare the output of the trained model with the ground truth for that portion of the training data to evaluate an accuracy of the trained model. The training of the machine learning model may be configured to cause the machine learning model to learn associations between training data (e.g., computing system data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include an architecture that is configured to determine a location of a user based on image data gathered from a user device 102 and may generate virtual certification number data for the user to use at the location. For example, the machine learning model may include one or more neural networks configured to identify features in the data, and may include further architecture, e.g., a connected layer, neural network, etc., configured to determine a relationship between the identified features in order to determine a location in the data. In certain embodiments, the machine learning model may include a single node for classification, as described elsewhere herein.

Although depicted as separate components in FIG. 1, it should be understood that a component or portion of a component in the exemplary environment 100 may, in some embodiments, be integrated with or incorporated into one or more other components. For example, the server device 104 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of generating virtual certification number data or of the machine learning model and/or how it may be trained or used to generate the virtual certification number data are discussed in further detail below. In the following disclosure, various acts may be described as performed or executed by a component from FIG. 1, such as the user device 102, the server device 104, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

The example environment 100 described above is provided merely as an example, and may include additional, fewer, different, or differently arranged aspects than depicted in FIG. 1.

Figure 2:
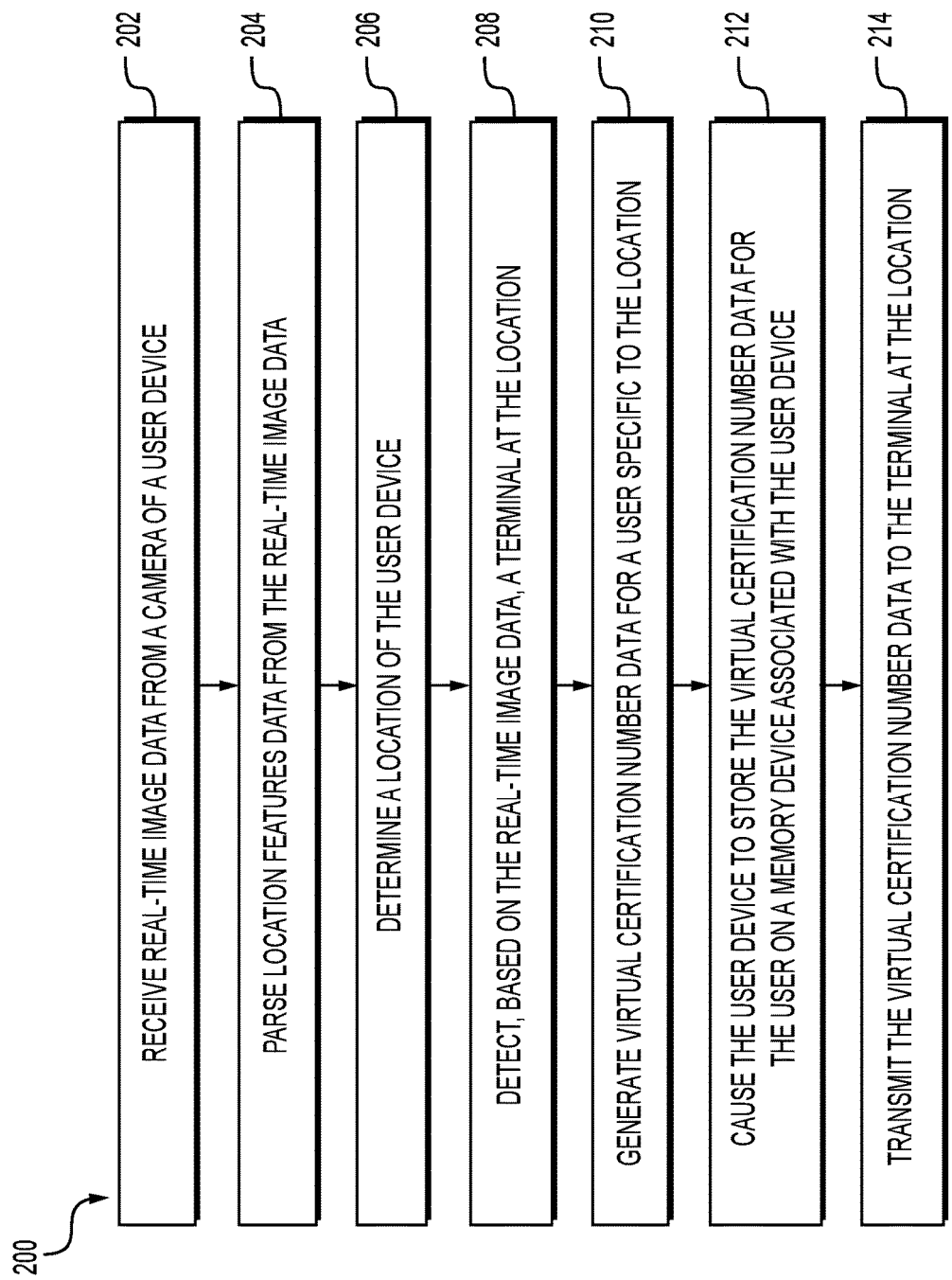
FIG. 2 depicts a flowchart of an exemplary method 200 of using location-related data for generating virtual certification number data for an interaction, according to one or more embodiments.

FIG. 2 depicts a flowchart of an exemplary method 200 of using location-related data for generating virtual certification number data for an interaction, according to one or more embodiments. In some embodiments, the method 200 may be performed by a user device 102. In other embodiments, the method 200 (or portions thereof) may be performed by a server device 104.

At step 202, the method 200 may include receiving real-time image data from a camera of a user device. For example, the user device 102 may receive real-time image data from a camera of the user device 102. The user device 102 may receive the real-time image data as a stream of images, as the camera periodically captures the image data, as a response to a user input to the user device 102 to cause the camera to capture the image data, as a response to user device 102 detecting that the user device 102 is proximate to a location (e.g., a merchant), and/or based on the like.

The image data may include one or more images, pictures, videos, and/or the like of an environment within a field of view of a camera of the user device 102. The image data may be real-time (or approximately real-time) image data. Real-time (or approximately real-time) image data may include image data gathered and/or processed as the user device 102 is in use, is worn, is moved about, and/or the like.

In some embodiments, the user device 102 may include a pair of smart eyeglasses or other such smart wearable (e.g., a wearable electronic device equipped with one or more sensors/components for collecting data and transmitting the like). In this case, the user may wear the user device 102 as the user goes about daily activities, and the camera of the user device 102 may capture the image data in real-time (or approximately real-time). The smart eyeglasses may be virtual reality (VR) or augmented reality (AR) eyeglasses. For example, in some arrangements, as a user goes about daily activities, AR eyeglasses may generate a composite view by superimposing a computer-generated image on a user's view of the real world.

The method 200 may include, at 204, parsing location features data from the real-time image data. For example, the user device 102 may parse location features data from the real-time image data. The user device 102 may parse the location features data based on receiving the image data, based on the user inputting a command to the user device 102 to parse the image data, based on the user device 102 detecting that the user device 102 is proximate to a location (e.g., a merchant), and/or the like.

The user device 102 may use one or more machine learning models to parse the image data. For example, the user device 102 may input the image data into the one or more machine learning models and the one or more machine learning models may process the image data to extract the location features data and provide the same as output. Continuing with this example, the one or more machine learning models may process the image data to extract features, such as names on buildings, shapes or designs of buildings, and/or the like shown in the image data. In this way, location features data may include text, objects, and/or the like shown in the image data that may indicate a location of the user. For example, the one or more machine learning models may extract the text "Grocery Store" from a sign in the image data as the user walks toward a building entrance and may determine that this text is location features data. As specific examples in a merchant context, the location features data may include a logo or image associated with the location, a brand or trade name associated with the location, an item type associated with the location, a sign, document, or menu, associated with the location, a floorplan layout associated with the location, and/or the like.

In some embodiments, the user device 102 may be configured to determine whether the user device is inside a building, within a structure, at an outdoor vendor location, and/or the like. In this case, the location features data may include a back side of a door, a ceiling, one or more inside windows, artificial lighting, building structure features (e.g., single-store structure features or multi-store structure features), and/or the like. In some embodiments, the user device 102 may be configured to determine whether the user device is outside a building or structure. For example, the location features data may include determining that the user device is outside, e.g., by extracting features related to the environment (e.g., clouds, sunlight, etc.), cars, parking lot features (e.g., pavement, painted lines, traffic signs, etc.), building exteriors (e.g., bricks, siding, etc.), vendors (e.g., food trucks, parking lot kiosks, and/or related signage, etc.), etc.

As step 206, the method 200 may include determining a location of the user device. For example, the user device 102 may determine the location of the user device. The user device 102 may determine the location based on the location features data, based on receiving a command from a user of the user device 102 to determine the location, based on time (e.g., periodically), and/or the like. Additionally, or alternatively, the user device 102 may determine the location based on other data indicating that the user device 102 may be located at, or proximate to, a certain type of location. For example, the user device 102 may use GPS data to determine that the user device 102 is at or proximate to a shopping center, a shopping mall, a store, and/or the like, and may determine the location, e.g., address or coordinates, based on the GPS data. In such examples, the user device 102 may include a GPS receiver for determining a location of the user device 102.

In certain embodiments, the user device 102 may process the location features data to determine the location. For example, the user device 102 may process text extracted from the image data, building shapes or designs extracted from the image data, environmental data (e.g., the sky, a forest, pavement, etc.), and/or the like to determine a location associated with the text, shapes, designs, etc. The user device 102 may compare the location features data to a database of location features data and may determine the location based on a match. Additionally, or alternatively, the user device 102 may use one or more machine learning models to determine the location. For example, the user device 102 may input the location features data into a machine learning model and the machine learning model may determine a similarity of the text (or a stylization of the text) to other text on which the machine learning model has been trained, may determine likely missing letters from text that is partially obscured in the image data, may determine a similarity of a design or shape of a building to other building designs or shapes on which the machine learning model has been trained, and/or the like.

The machine learning model may output various locations and corresponding scores that indicate a likelihood that the user device 102 is at the location. The user device 102 may then use this output to determine the location. For example, the user device 102 may select the location with the highest output corresponding location score. In some embodiments, the user device 102 may generate and output a request for user selection regarding the determined location. For example, user device 102 may, after determining a likelihood that the user device 102 is located at one or more locations, generate a GUI to request user confirmation of the location. Accordingly, in locations with a plurality of merchants (e.g., a shopping mall), the user device 102 may determine that location A and location B are the most likely locations of the user device 102 based on the parsed location features data. In this example, location A and location B may be two stores next door to each other in a shopping mall. Once so determined, the user device 102 may output a GUI requesting confirmation from the user as to which of location A and location B is most accurate. In response to a user input selecting location A, the user device 102 may conclude that the user input 102 is at location A and not at location B.

In examples in which the user device 102 include AR eyeglasses, the user device 102 may output an augmented image including a GUI identifying one or more locations from which the user may select an accurate location. Selection may be completed based on interacting with the GUI via any appropriate input device or method (e.g., manual selection controller, retinal control, and/or audio control). For example, the AR glasses may provide a list of possible locations and may request the user select a location for confirmation. The AR glasses may receive confirmation via pupil tracking, gesture interaction, etc. In some examples, the AR glasses may provide informational alerts to the user. For example, the AR glasses may alert the user that the location may have been recognized as a grocery store.

The one or more machine learning models may have been trained to learn relationships between (i) training real-time image data that includes prior location features data and (ii) prior locations data associated with the prior location features data. For example, the training set of data for the one or more machine learning models may include location features data and locations data that identifies locations corresponding to the location features data. In this way, the one or more machine learning models may have been trained such that the one or more trained machine learning models are configured to use the learned relationships to determine the location of the user device 102 based on input of the real-time image data.

Additionally, or alternatively, the user device 102 may correlate a determined location with other data, such as GPS data, to determine the location. For example, the user device 102 may use the GPS data to confirm that the location with the highest score from the machine learning model matches the GPS data. In another example, the user device 102 may select a different location based on the GPS data, indicating that the user device 102 is at a different location than the location with the highest score from the machine learning model. This may improve location determination in scenarios where multiple locations might appear simultaneously in the image data or where various locations are densely packed, such as in a shopping mall.

In some embodiments, when determining the location, the user device 102 may determine whether the user device is inside a building of the location. User device 102 may be configured to make this determination by detecting location features data, for example, a back side of a door, a ceiling, one or more windows (e.g., inside windows), artificial lighting, etc. For example, the user device 102 may use a trained machine learning model to output a determination as to whether the user device 102 is inside the building based on the input of the image data and/or parsing of the location features data from the image data. The trained machine learning model may have been trained to learn relationships between (i) training real-time image data that includes prior location features data and (ii) prior inside or outside indications data associated with the prior location features data. For example, the training set of data for the machine learning model may include location features data for inside or outside locations and locations data that identifies the location. In this way, the machine learning model may be trained such that the trained machine learning model is configured to use the learned relationships to determine whether the user device 102 is inside the building of the location based on input of the real-time image data.

In some embodiments, the user device 102 may use sequential processing to determine the location. Sequential processing may describe processing data that occurs in the order that the data is received. For example, the user device 102 may detect a front door then the interior of a store. Based on this sequence, it may be determined that the location may be interior of the location with the front door.

At step 208, the method 200 may include detecting, based on the real-time image data, a terminal at the location. For example, the user device 102 may detect, based on the real-time image data, a terminal at the location. The user device 102 may detect the terminal based on processing the image data, based on determining that the user device 102 is at a certain type of location (e.g., a merchant), based on receiving a command from a user of the user device 102, and/or the like.

The user device 102 may detect the terminal based on parsing location features data from the image data in a manner similar to that described at step 204. For example, after determining that the user device 102 is located at a certain location (e.g., a merchant), the user device 102 may process the image data as the user device 102 is moved about by the user to detect the terminal. Similar to that described elsewhere herein, the user device 102 may use one or more machine learning models to extract features from the image data and may process the features from the image data to detect objects in the image data. After detecting the objects in the image data, the one or more machine learning models may classify the objects and determine a score for how similar the detected objects are to the classification. When the one or more machine learning models determine that an object in the image data is classified as a terminal with a score higher than a threshold, the one or more machine learning models may output an indication of this classification. Based on this output, the user device 102 may detect the terminal at the location.

The one or more machine learning models may further determine, in connection with detecting the terminal, whether the terminal is in the foreground of the image data rather than in the background of the image data. In this case, the one or more machine learning models may just classify objects detected in the foreground of the image data. This may help the user device 102 detect the terminal when the user of the user device 102 is located at or using the terminal, rather than, e.g., walking past the terminal while shopping. This may conserve computing resources of the user device 102 by reducing or eliminating irrelevant detections of the terminal in the image data.

As noted above, in some examples, the user device 102 may detect the terminal based on receiving a command from a user of the user device 102. In examples in which the user device 102 comprises AR eyeglasses, the user may interact with an interaction element of a GUI included in an output augmented image. For example, the user may interact with the augmented image to identify the terminal via any appropriate input device or method (e.g., manual selection controller, retinal control, and/or audio control).

At step 210, the method 200 may include generating virtual certification number data for a user specific to the location, or requesting virtual certification number data to be generated for the specific location. For example, the user device 102 may generate virtual certification number data specific to the location for a user, or transmit a request to server device 104 to generate the same. The user device 102 or server device 104 may generate the virtual certification number data based on detecting the terminal at the location, based on receiving a command from the user of the user device 102, based on establishing a connection with the terminal (e.g., the user device 102 and the terminal may establish a connection or otherwise communicate when within a distance of each other), and/or the like.

The virtual certification number data may include a number (or alphanumeric information) that can be used to complete an interaction. For example, the user device 102 or server device 104 may generate a virtual interaction number. The user device 102 or server device 104 may generate virtual certification number data that represents (or can be decoded to identify) the user, an account associated with the user, the user device 102, the location, the terminal, and/or the like. For example, the user device 102 may input alphanumeric information identifying the user, the account, or the user device 102 into a cryptographic element of the user device 102, and the cryptographic element may output the virtual certification number data.

The virtual certification number data may be specific to the location. For example, the user device 102 or server device 104 may generate virtual certification number data for the specific location at which the user device 102 is located (e.g., generate different virtual certification numbers for different merchants). Additionally, or alternatively, the user device 102 or server device 104 may generate virtual certification number data specific for the terminal. Generating virtual certification number data specific to the location and/or the terminal may increase security of the virtual certification number data as the virtual certification number data, if stolen by a malicious actor, may not be usable at different locations and/or different terminals at the location.

The method 200 may include, at step 212, causing the user device to store the virtual certification number data for the user on a memory device associated with the user device 102. For example, the user device 102 may store the virtual certification number data in the memory 112A. The user device 102 may store the virtual certification number data after generating the virtual certification number data, based on receiving a command from the user of the user device 102 to store the virtual certification number data, after receiving a transmission from the server device 104 including the virtual certification number data or a command relating thereto, and/or the like. The user device 102 may store the virtual certification number data in a memory device accessible by an application installed on the user device 102 and/or another user device 102. For example, the user device 102 may transmit the virtual certification number data to a server device 104 or a cell phone associated with the user for storage. The user device 102 may store the virtual certification number data in temporarily. For example, the user device 102 may store the virtual certification number data for an amount of time, until an interaction is completed at the terminal using the virtual certification number, until the user leaves the location and/or a connection with the terminal is disconnected, and/or the like.

The method 200 may include, at step 214, transmitting the virtual certification number data to the terminal at the location. For example, the user device 102 may transmit the virtual certification number data to the terminal via a wireless antenna, using a near-field communication (NFC) connection, using a Bluetooth connection, and/or the like. In some embodiments, the user device 102 may cause another user device 102 to transmit the virtual certification number data. For example, the user device 102 may provide the virtual certification number data to a cell phone or an interaction certification mechanism (e.g., payment card) of the user with a command to use the virtual certification number data to complete an interaction with the terminal.

In some embodiments, the terminal may communicate with a server device 104 to complete the interaction. For example, the terminal may provide the virtual certification number data to the server device 104 to record the interaction, to confirm that the user has a sufficient balance for completing the interaction, and/or the like. Additionally, or alternatively, the user device 102 (or another user device 102) may communicate with the server device 104 to complete the interaction. For example, the user device 102 may confirm the interaction, the server device 104 may prompt the user, e.g., via a cell phone of the user, to confirm the interaction, and/or the like.

In some embodiments, after transmitting the virtual certification number data to the terminal, the user device 102 may receive an approval indication associated with the interaction and/or the virtual certification number data. For example, the approval indication may indicate that the interaction has been approved, that the virtual certification number data has been accepted for the interaction, and/or the like. The user device 102 may then present, via a display of the user device 102 or another user device 102, a graphical representation of the approval indication. For example, when the user device 102 is a pair of smart eyeglasses, the user device 102 may present the graphical representation via a lens or other display of the pair of eyeglasses or may provide the approval indication to a cellphone of the user for display.

The user device 102 may determine whether the location of the user device 102 has changed. For example, and in a merchant context, the user device 102 may determine whether the user device 102 has been moved to a different store or to a different terminal in the store. The user device 102 may determine whether the location has changed at any time after determining the location and/or generating the virtual certification number data. Upon determining that the location of the user device has changed, the user device 102 may delete the virtual certification number data from the memory device associated with the user device 102.

The example method 200 is provided merely as an example, and may include additional, fewer, different, or differently arranged aspects than depicted in FIG. 2.

Figure 3A:
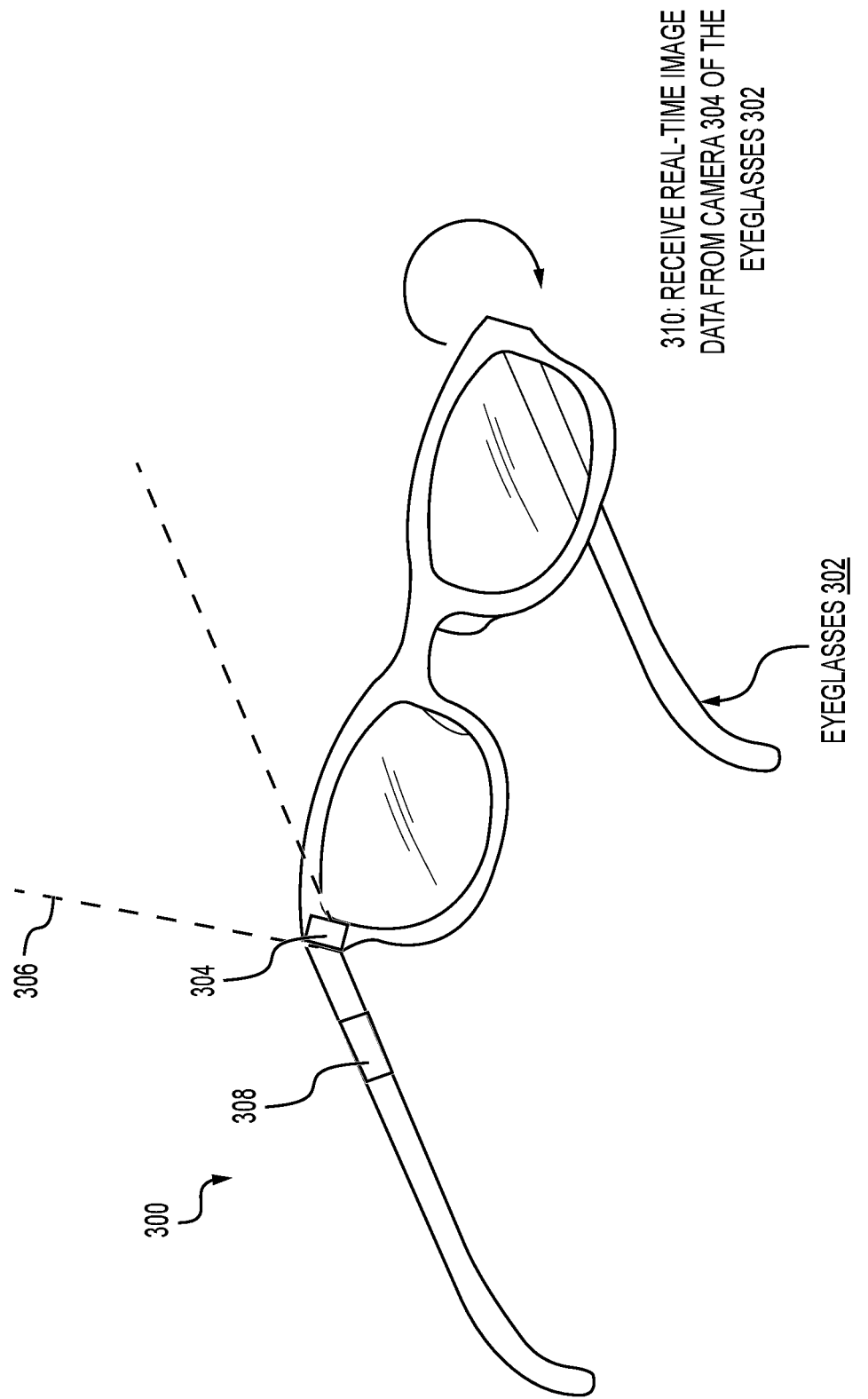

FIGS. 3A-3F depict an example 300 of using location-related data for generating virtual certification number data for an interaction, according to one or more embodiments. As illustrated in FIG. 3A, the example 300 includes eyeglasses 302 as an example user device 102. The eyeglasses 302 may be, e.g., a pair of smart eyeglasses that include a camera 304 that has a field of view 306 and one or more other components 308. The other components 308 may include, e.g., a processor, a memory, a sensor (e.g., a GPS receiver), etc. As illustrated at 310, the eyeglasses 302 may receive real-time image data from the camera 304 of the eyeglasses 302. For example, the eyeglasses 302 may receive the real-time image data as a user of the eyeglasses 302 wears the eyeglasses 302 while moving about, e.g., in a manner similar to that described above at step 202 of FIG. 2.

Figure 3B:
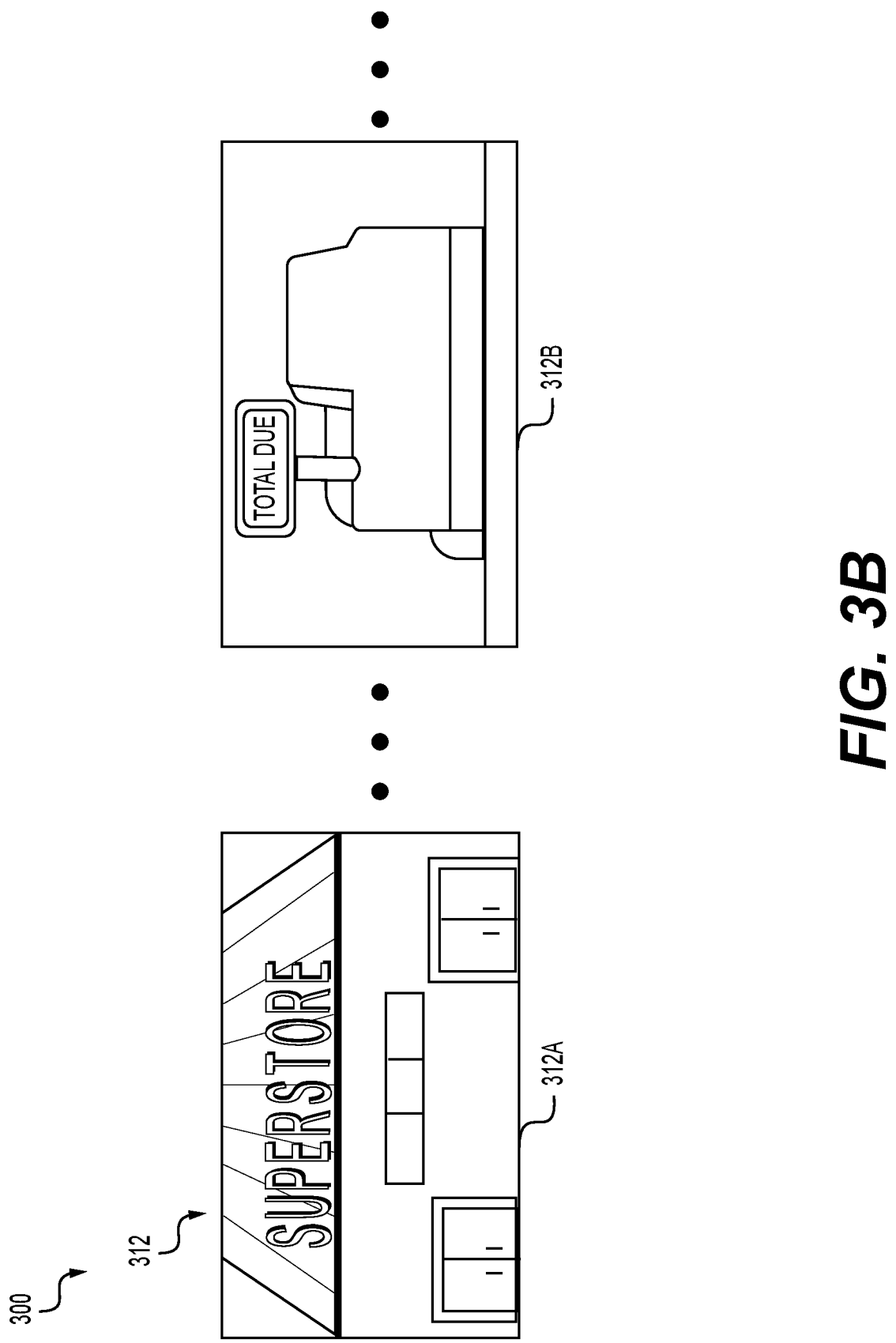
Figure 3C:
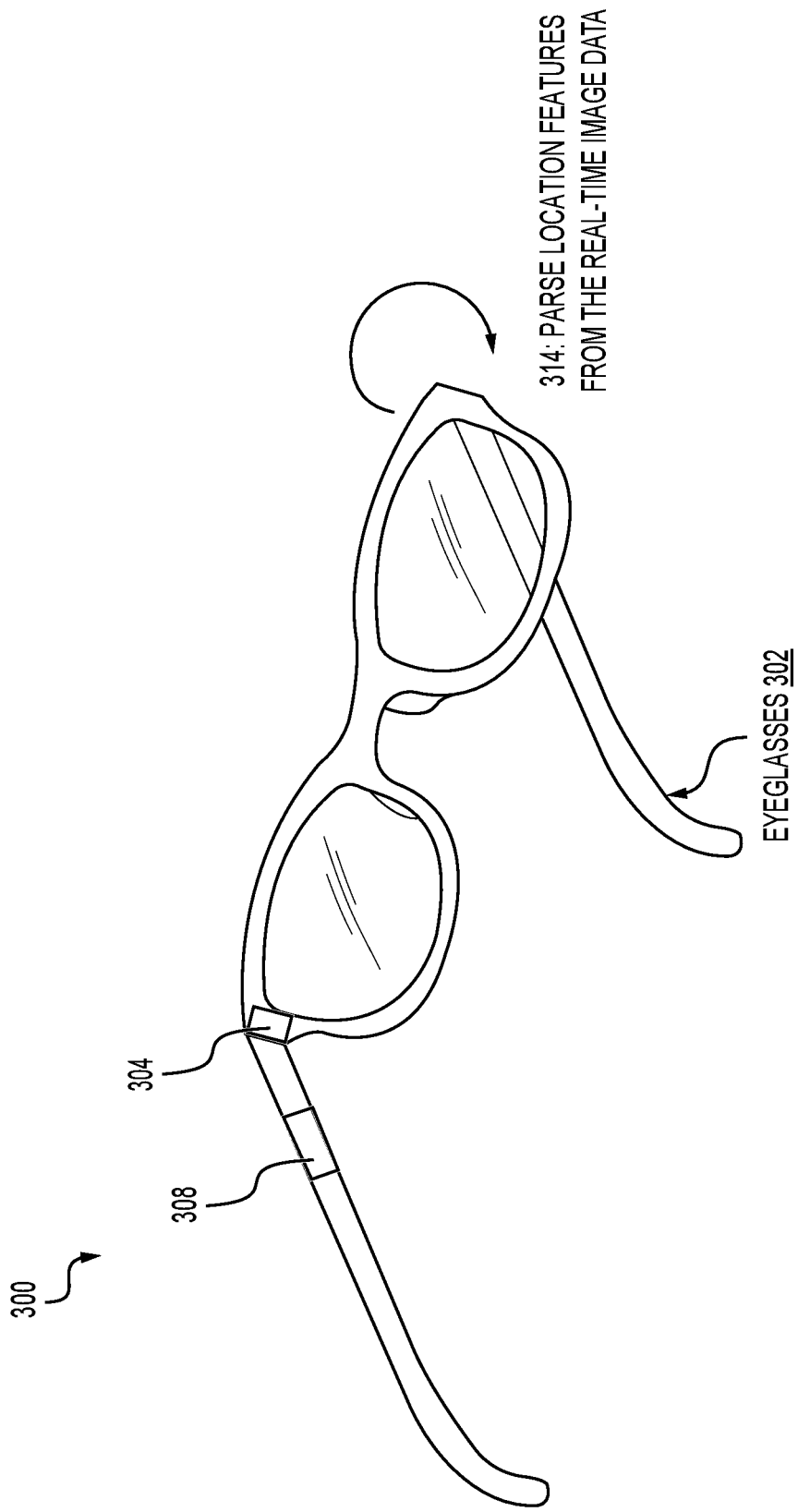

Turning to FIG. 3B, the image data may include one or more images 312. For example, the image data may include an image 312A of an exterior of a building that the user was approaching, an image 312B of a terminal when the user is checking out, and/or the like. In this way, the eyeglasses 302 may gather image data as the user moves about over time. Turning to FIG. 3C, and as illustrated at 314, the eyeglasses 302 may parse location features from the real-time image data. For example, the eyeglasses 302 may parse text, objects, and/or the like from the images 312, e.g., in a manner similar to that described above at 204.

Figure 3D:
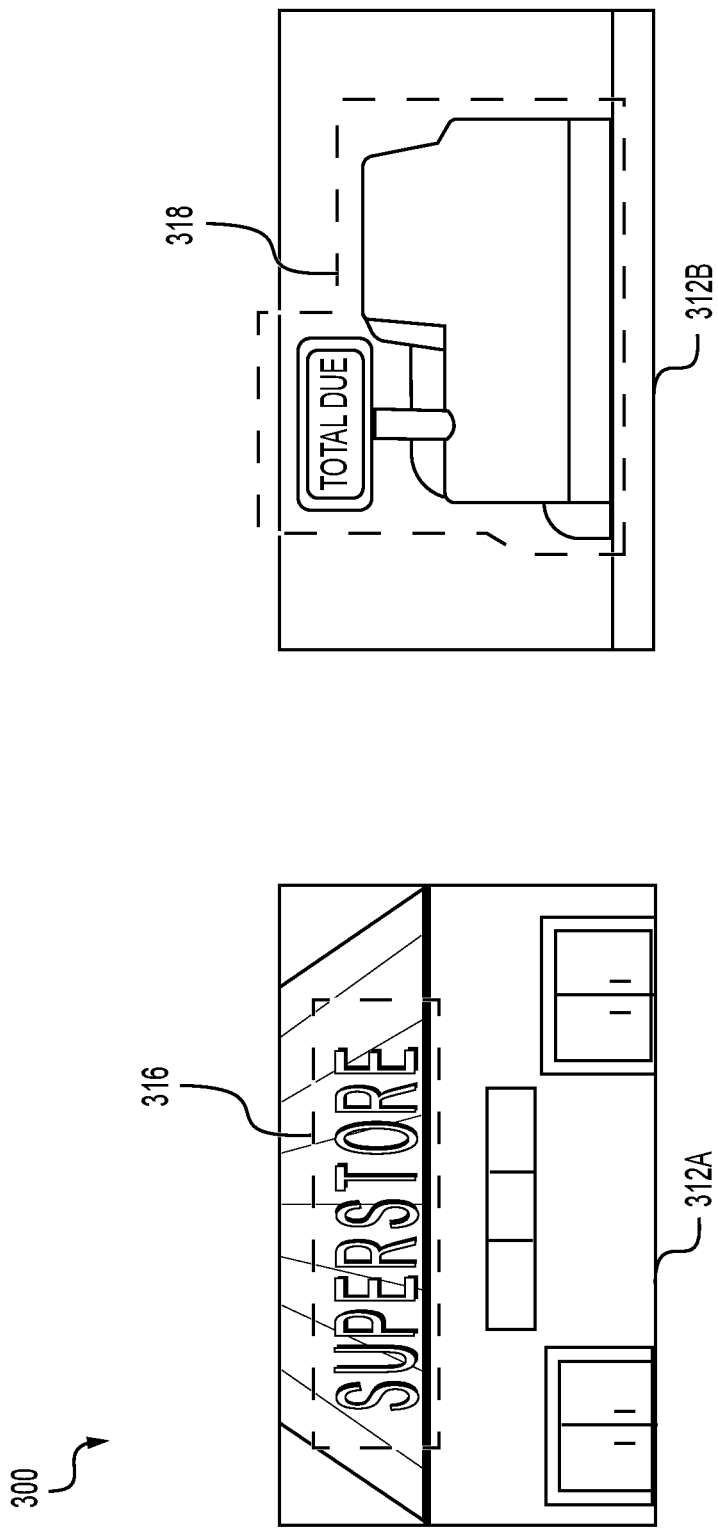

FIG. 3D illustrates an example of parsing the images 312. For example, for the image 312A, the eyeglasses 302 may parse text (e.g., the text "SUPERSTORE" shown at 316) from the image 312A. As another example, and for the image 312B, the eyeglasses 302 may parse objects (e.g., a terminal at 318) from the image 312B. Turning to FIG. 3E, the eyeglasses 302 may, at 320, determine a location of the eyeglasses 302. For example, the eyeglasses 302 determine that the wearer of the eyeglasses 302 is at a merchant based on the text at 316 parsed from the image 312A, e.g., in a manner similar to that described above at 206 of FIG. 2.

As illustrated at 322, the eyeglasses 302 may detect a terminal at the location. For example, the eyeglasses 302 may detect the terminal based on the object at 318 parsed from the image 312B, e.g., in a manner similar to that described above at 208 of FIG. 2. As illustrated at 324, the eyeglasses 302 may generate virtual certification number data for the user specific to the location. For example, the eyeglasses 302 may generate the virtual certification number data specific to the merchant, e.g., in a manner similar to that described above at 210 of FIG. 2.

Figure 3F:
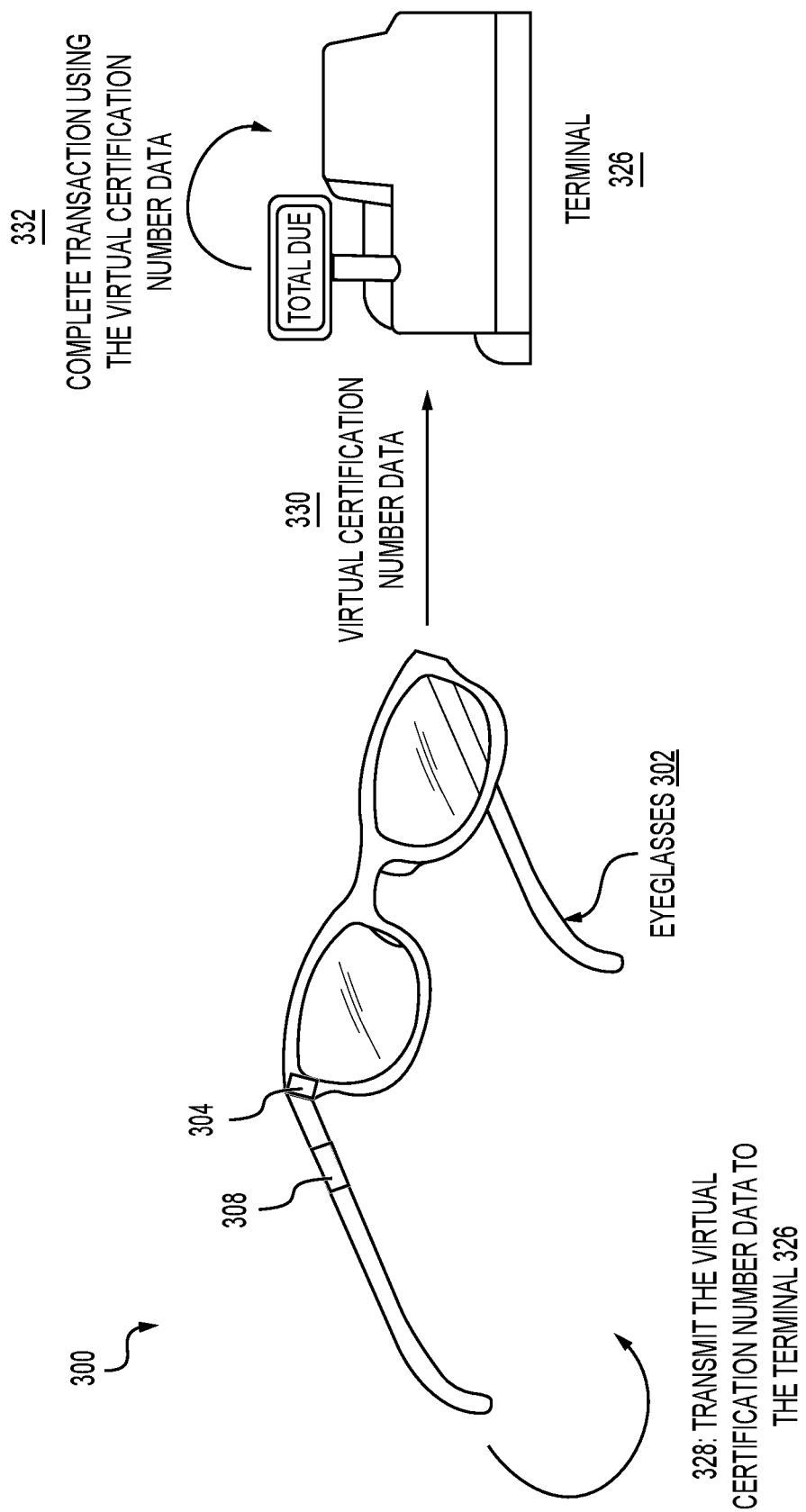

Turning to FIG. 3F, and as illustrated at 328, the eyeglasses 302 may transmit the virtual certification number data to the terminal (terminal 326), e.g., in a manner similar to that described above at 214 of FIG. 2. For example, the eyeglasses 302 may, at 330, transmit the virtual certification number data to the terminal 326, e.g., via an NFC connection, a Bluetooth connection, and/or the like. As illustrated at 332, the terminal 326 may complete an interaction using the virtual certification number data, in a manner similar to that described elsewhere herein.

The example 300 described above is provided merely as an example, and may include additional, fewer, different, or differently arranged aspects than depicted in FIGS. 3A-3F.

Figure 4:
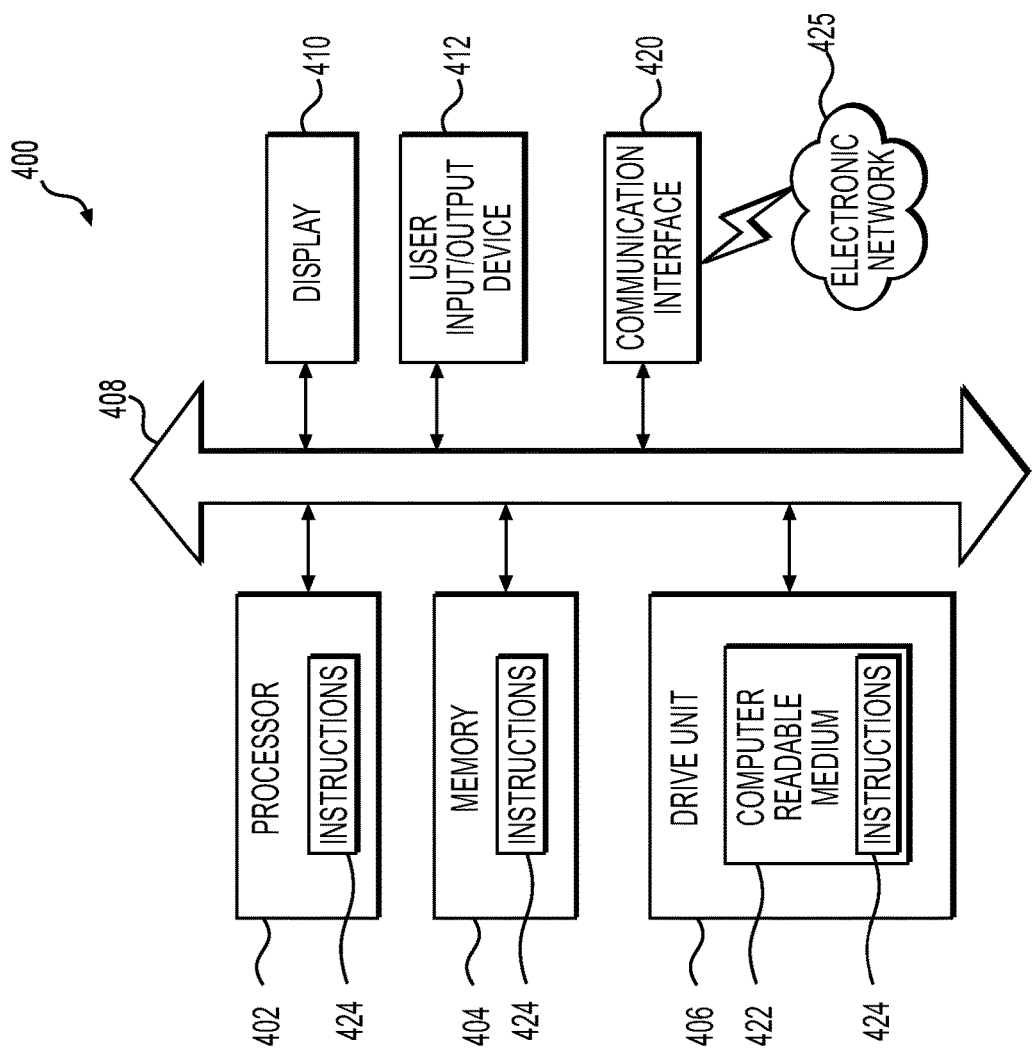
FIG. 4 depicts an example of a computing device, according to one or more embodiments.

In this way, the above referenced systems and methods may increase interaction security for merchants and for customers. Communication as described herein between the hardware and software components may allow for confirmation of a customer's virtual certification numbers with respect to a given merchant and the user device's location at the time of use of their virtual certification numbers. This may reduce the amount of fraudulent activity, e.g., fraudulent use of the virtual certification numbers, and/or prevent fraudulent activity, which is often detected only after the fraudulent activity has occurred and can no longer be prevented. FIG. 4 depicts an example of a computer 400, according to certain embodiments. FIG. 4 is a simplified functional block diagram of a computer 400 that may be configured as a device for executing processes or operations depicted in, or described with respect to, FIGS. 1-3F, according to exemplary embodiments of the present disclosure. For example, the computer 400 may be configured as the user device 102, server device 104, and/or another device according to exemplary embodiments of this disclosure. In various embodiments, any of the systems herein may be a computer 400 including, e.g., a data communication interface 420 for packet data communication. The computer 400 may communicate with one or more other computers 400 using the electronic network 425. The network interfaces 114A and 114B in FIG. 1 may include one or more communication interfaces 420. The electronic network 425 may include a wired or wireless network similar to the network 106 depicted in FIG. 1.

The computer 400 also may include a central processing unit (CPU), in the form of one or more processors 402, for executing program instructions 424. The processors 110A and 110B depicted in FIG. 1 may include one or more processors 402. The computer 400 may include an internal communication bus 408, and a drive unit 406 (such as read-only memory (ROM), hard disk drive (HDD), solid-state disk drive (SDD), etc.) that may store data on a computer readable medium 422, although the computer 400 may receive programming and data via network communications. The computer 400 may also have a memory 404 (such as random access memory (RAM)) storing instructions 424 for executing techniques presented herein, although the instructions 424 may be stored temporarily or permanently within other modules of the computer 400 (e.g., processor 402 and/or computer readable medium 422). The memories 112A and 112B depicted in FIG. 1 may include one or more memories 404. The computer 400 also may include user input and output devices 412 and/or a display 410 to connect with input and output devices 412 such as keyboards, mice, touchscreens, monitors, displays, etc. In some examples, the user input and output devices 412 may include tracking inputs and/or audio inputs. These inputs may be configured to capture AR device functions. The displays 108A and 108B may include one or more displays 410. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to processing image data for generating virtual certification number data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to processing image data, any suitable activity may be used. In an exemplary embodiment, instead of or in addition to processing image data, certain embodiments include processing location-related data (e.g., GPS data).

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for generating virtual certification number data, the method comprising:

receiving real-time image data from a camera of a user device;

parsing location features data from the real-time image data;

determining, based on the location features data, a location of the user device;

upon determining the location of the user device, detecting, based on the real-time image data, a terminal at the location;

upon detecting the terminal at the location, generating virtual certification number data for the user specific to the location;

causing the user device to store the virtual certification number data for the user on a memory device associated with the user device; and transmitting the virtual certification number data to the terminal at the location.

2. The computer-implemented method of claim 1, further comprising:

after transmitting the virtual certification number data to the terminal at the location, receiving an approval indication associated with the virtual certification number data; and causing the user device to present, via a display of the user device, a graphical representation of the approval indication.

3. The computer-implemented method of claim 1, further comprising:

receiving Global Positioning System (GPS) location data from a sensor of the user device, wherein determining the location of the user device is further based on the GPS location data.

4. The computer-implemented method of claim 1, wherein the location of the user device is further determined using a trained machine learning model trained to output the location of the user device upon input of real-time image data, wherein the trained machine learning model has been trained to learn relationships between (i) training real-time image data that includes prior location features data and (ii) prior locations data associated with the prior location features data, such that the trained machine learning model is configured to use the learned relationships to determine the location of the user device in response to input of the real-time image data.

5. The computer-implemented method of claim 1, wherein determining the location of the user device includes determining whether the user device is inside a building of the location based on whether the features data includes data representing one or more of:

a back side of a door;
a ceiling;
one or more inside windows; or
artificial lighting.

6. The computer-implemented method of claim 5, wherein determining whether the user device is inside a building of the location is further determined using a trained machine learning model trained to output a determination as to whether the user device is inside the building of the location upon input of real-time image data, wherein the trained machine learning model has been trained to learn relationships between (i) training real-time image data that includes prior location features data and (ii) prior inside or outside indications data associated with the prior location features data, such that the trained machine learning model is configured to use the learned relationships to determine whether the user device is inside the building of the location in response to input of the real-time image data.

7. The computer-implemented method of claim 1, wherein the location features data comprises data representing one or more of:

a logo or image associated with the location;
a brand or trade name associated with the location;
an item type associated with the location;
a sign, document, or menu, associated with the location; or
a floorplan layout associated with the location.

8. The computer-implemented method of claim 1, wherein transmitting the virtual certification number data to the terminal at the location comprises:

causing a Near-Field Communications device associated with the user device to transmit the virtual certification number data to the terminal at the location;

causing a second user device to transmit the virtual certification number data to the terminal at the location, wherein the second user device is a smartphone or tablet computer; or causing an electronic certification mechanism to transmit the virtual certification number data to the terminal at the location, the electronic certification mechanism configured to receive and transmit the virtual certification number data.

9. The computer-implemented method of claim 1, further comprising:

determining whether the location of the user device has changed based on the location features data; and upon determining that the location of the user device has changed, deleting the virtual certification number data from a memory device associated with the user device.

10. The computer-implemented method of claim 1, wherein the real-time image data includes picture or video images of an environment surrounding the user device.

11. The computer-implemented method of claim 1, wherein the user device is a wearable device equipped with a plurality of cameras.

12. A computer-implemented method for generating virtual certification number data, the method comprising:

receiving real-time image data from one or more cameras of a wearable user device, wherein the real-time image data includes picture or video images of an environment surrounding the wearable user device;

parsing location features data from the real-time image data;

determining, based on the location features data, a location of the wearable user device;

upon determining the location of the wearable user device, detecting, based on the real-time image data, a terminal at the location;

upon detecting the terminal at the location, generating virtual certification number data for the user specific to the location;

causing the user device to store the virtual certification number data for the user on a memory device associated with the wearable user device;

transmitting the virtual certification number data to the terminal at the location;

after transmitting the virtual certification number data to the terminal at the location, receiving an approval indication associated with the virtual certification number data; and causing the user device to present, via a display of the wearable user device, a graphical representation of the approval indication.

13. The computer-implemented method of claim 12, further comprising:

receiving GPS location data from a sensor of the wearable user device, wherein determining the location of the wearable user device is further based on the GPS location data.

14. The computer-implemented method of claim 12, wherein the location of the wearable user device is further determined using a trained machine learning model trained to output the location of the wearable user device upon input of real-time image data, wherein the trained machine learning model has been trained to learn relationships between (i) training real-time image data that includes prior location features data and (ii) prior locations data associated with the prior location features data, such that the trained machine learning model is configured to use the learned relationships to determine the location of the wearable user device in response to input of the real-time image data.

15. The computer-implemented method of claim 12, wherein determining the location of the wearable user device includes determining whether the user device is inside a building of the location based on whether the location features data includes data representing one or more of:
   a back side of a door;
   a ceiling;
   one or more inside window; or
   artificial lighting.

16. The computer-implemented method of claim 15, wherein determining whether the wearable user device is inside a building of the location is further determined using a trained machine learning model trained to output a determination as to whether the wearable user device is inside the building of the location upon input of real-time image data, wherein the trained machine learning model has been trained to learn relationships between (i) training real-time image data that includes prior location features data and (ii) prior inside or outside indications data associated with the prior location features data, such that the trained machine learning model is configured to use the learned relationships to determine whether the wearable user device is inside the building of the location in response to input of the real-time image data.

17. The computer-implemented method of claim 12, wherein the location features data comprises data representing one or more of:
   a logo or image associated with the location;
   a brand or trade name associated with the location;
   an item type associated with the location;
   a sign, document, or menu, associated with the location; or
   a floorplan layout associated with the location.

18. The computer-implemented method of claim 12, wherein transmitting the virtual certification number data to the terminal at the location comprises:
   causing a Near-Field Communications device associated with the user device to transmit the virtual certification number data to the terminal at the location;
   causing a second user device to transmit the virtual certification number data to the terminal at the location, wherein the second user device is a smartphone or tablet computer; or
   causing an electronic certification mechanism to transmit the virtual certification number data to the terminal at the location, the electronic certification mechanism configured to receive and transmit the virtual certification number data.

19. The computer-implemented method of claim 12, further comprising:
   determining whether the location of the user device has changed based on the location features data; and
   upon determining that the location of the user device has changed, deleting the virtual certification number data from a memory device associated with the user device.

20. A computer-implemented system for generating virtual certification number data, the system comprising:
   a memory having processor-readable instructions therein; and
   at least one processor configured to access the memory and execute the processor-readable instructions, which when executed by the processor configures the processor to perform a plurality of functions, including functions for:
      receiving real-time image data from a camera of a user device;
      parsing location features data from the real-time image data;
      determining, based on the location features data, a location of the user device;
      upon determining the location of the user device, detecting, based on the real-time image data, a terminal at the location;
      upon detecting the terminal at the location, generating virtual certification number data for the user specific to the location;
      causing the user device to store the virtual certification number data for the user on a memory device associated with the user device; and
      transmitting the virtual certification number data to the terminal at the location.

* * * * *